United States Patent Office 3,501,271
Patented Mar. 17, 1970

3,501,271
TiO₂ PRECIPITATION PROCESS
Walter Twist, Hartlepool, Leslie John Lawrence, Nunthorpe, Middlesbrough, and Tom Lloyd Cordey, Stockton-on-Tees, England, assignors to British Titan Products Company Limited, Billingham, England, a corporation of the United Kingdom
No Drawing. Filed Oct. 4, 1967, Ser. No. 672,747
Claims priority, application Great Britain, Nov. 5, 1966, 49,696/66
Int. Cl. C01g 23/04, 23/06, 23/08
U.S. Cl. 23—202                 17 Claims

ABSTRACT OF THE DISCLOSURE

A process for the thermal hydrolysis of aqueous titanium sulphate solution comprising nucleating the solution; heating it to a substantially constant temperature in the range 90° to 108° C. for a period of time sufficient to hydrolyse between 15% and 60% of the titanium sulphate thereafter raising the temperature of the solution by an amount in the range 2° C. to 18° C. and maintaining the temperature of the solution at a value such that the rate of hydrolysis is not greater than 1% (of the initial titanium sulphate content) per minute.

---

The present invention relates to an improved process for the production of pigmentary titanium dioxide.

Pigmentary titanium dioxide is commonly produced by the "sulphate" process in which an iron-containing titaniferous material, for example ilmenite or a titaniferous slag derived therefrom, is digested with concentrated sulphuric acid; the iron in the resulting solution is reduced to the ferrous state; the solution is clarified and usually some ferrous iron is removed, for example by crystallisation. The resulting aqueous solution of titanium sulphate (having acceptable iron/titanium and acid/titanium ratios) is then usually seeded with anatase- or rutile-inducing nuclei, as required and subjected to thermal hydrolysis to precipitate hydrous titanium dioxide.

The hydrous titanium dioxide may then be recovered, washed, leached (usually in the presence of trivalent titanium) and additioned with precalcination additions, as desired, and calcined. After calcination the material is generally subjected to a number of treatments to develop more fully the pigmentary properties of the material.

It has now been found that such a process may not produce a titanium dioxide pigment having the highest whiteness which can be obtained from the titanium sulphate solution used.

In co-pending U.S. application 646,457, filed June 16, 1967, by Walter Twist there is described an improved process for the hydrolysis of titanium sulphate solutions wherein titanium dioxide pigments of improved whiteness can be produced by carrying out the hydrolysis under such conditions that hydrous titanium dioxide is precipitated at a substantially constant rate not in excess of about 1.2% per minute of the titanium sulphate initially present in the solution (expressed as TiO₂).

Such a process has been found to give titanium dioxide pigments (after suitable treatment) of greatly improved whiteness but in some cases the texture of the titanium dioxide thus produced, after washing, leaching, additioning and calcining, may be such as to require prolonged milling, for example by sand milling, before the highest tinting strength of which it is capable can be developed.

It is an object of the present invention to provide a process which avoids or minimises this disadvantage.

Accordingly, the present invention is a process for the thermal hydrolysis of aqueous titanium sulphate solution comprising nucleating the solution; heating it to a substantially constant temperature in the range 90° C. to 108° C. for a period of time sufficient to hydrolyze between 15% and 60% of the titanium sulphate thereafter raising the temperature of the solution by an amount in the range 2° C. to 18° C. and maintaining the temperature of the solution at a value such that the rate of the hydrolysis is not greater than 1% (of the initial titanium sulphate content) per minute.

The aqueous titanium sulphate solution may be prepared in any suitable manner but is preferably prepared in the same manner as are such solutions in the normal sulphate process, i.e. by the digestion of ilmenite or a titaniferous slag derived therefrom with sulphuric acid at elevated temperatures followed by lixiviation of the resulting cake with water or dilute sulphuric acid.

Before using such a solution they may be contacted, if desired, with a reducing agent, for example scrap iron, to ensure that all the iron is in the ferrous state, and clarified by the flocculation of suspended impurities and decantation, filtration or by the use of a centrifuge.

Where the iron content is high, as in the case of titanium sulphate solutions prepared by the digestion of ilmenite, it may be desirable to remove some iron (as ferrous sulphate) by crystallisation, after cooling and/or concentration. It is preferred that the aqueous titanium sulphate solutions to be treated by the process of the present invention shall have a titanium concentration (expressed as TiO₂) in the range 100 g./litre to 300 g./litre and particularly one in the range 140 g./litre to 210 g./litre.

The iron/titanium ratio (expressed as Fe and TiO₂) is preferably not greater than 1.0 and particularly not greater than 0.5 and the acid/titanium ratio is preferably in the range 1.6 to 2.1. (The acid/titanium ratio is the ratio of free acid and acid associated with titanium to titanium (expressed as TiO₂).)

When a suitable titanium sulphate solution has been obtained, this is preferably nucleated by seeding with an appropriate quantity of nuclei. The preferred method of obtaining such nuclei is by the thermal hydrolysis of an aqueous titanium tetrachloride which has been partly neutralised, for example with sodium hydroxide, under carefully controlled conditions. As is well known the nuclei may be anatase- or rutile-inducing depending upon the exact method of preparation. Although the present invention may be applicable to the production of either anatase or rutile pigments, the use of rutile-inducing nuclei to give rutile pigments is preferred.

Where the nuclei are prepared externally, for example by the hydrolysis of aqueous titanium tetrachloride solutions as previously mentioned, it is preferred to add a quantity (expressed as TiO₂) of the nuclei in range 0.05% to 5.0% on the titanium sulphate content (expressed as TiO₂) of the solution, and particularly a quantity in the range 1% to 4%, e.g. when rutile-inducing nuclei are used.

In previously used processes for the production of titanium dioxide by the sulphate process the hydrolysis of the titanium sulphate solutions is carried out by heating the solution to a substantially constant temperature (except for changes in temperature due to variations in the concentration of dissolved materials which take place during thermal hydrolysis) which is usually at or about the boiling point of the aqueous titanium sulphate solution.

In the process of the present invention, however, the temperature during the thermal hydrolysis is initially maintained at a substantially constant value in the range 90° C. to 108° C. and preferably at a value in the range 95° C. to 99° C. until between about 15% to 60% and preferably between 15% to 25% of the titanium sulphate has been hydrolysed to $TiO_2$.

The percentage of titanium sulphate which has been hydrolysed can be found by removing an aliquot of the solution, cooling rapidly if necessary to prevent further hydrolysis and thereafter separating off the insoluble hydrous titanium dioxide, for example by means of a centrifuge, and estimating the amount of soluble titanium in the mother liquor and/or the weight of $TiO_2$ precipitated.

Practically, it has been found possible to estimate the end point of the initial constant temperature stage by the first appearance of the so-called "grey stage," i.e. when the colour of the titanium sulphate solution (which is initially black) becomes grey due to the precipitation of sufficient insoluble white hydrous titanium dioxide to give rise to this visual colour change.

After the initial period of heating at substantially constant temperature, the temperature of the solution is raised by an amount in the range 2° C. to 18° C. and preferably by an amount in the range 3° C. to 10° C.

Generally, this rise in temperature should be carried out over a relatively short period, for example not more than about 25 minutes and preferably over a period in the range 3 to 10 minutes.

After this rise in temperature has reached the desired maximum it may be maintained, if desired, at this level for a short period, for example not more than 30 minutes and particularly up to about 5 minutes.

The temperature of the solution may then be lowered, for example to a temperature in the range 85° C. to 95° C., over a period of time, for example over a period of from 30 to 180 minutes, and maintained at a value which is such as to ensure that the rate of hydrolysis is not greater than about 1% (of the initial titanium sulphate) per minute until the hydrolysis is terminated.

It has been found that where the rate of hydrolysis exceeds 1% the brightness of the pigment deteriorates although the tinting strength which can be developed may remain reasonably high.

It is preferred that the rate of hydrolysis be maintained in the range 0.2% to 1% and particularly in the range 0.3% to 0.8% per minute throughout this period.

If the maximum temperature to which the titanium sulphate solution is raised after the initial constant temperature hydrolysis is not greater than that required to give a hydrolysis rate in excess of 1% per minute then it may not be necessary to reduce the temperature below this level, although it is preferred to do so.

After reaching the maximum temperature immediately after the initial constant temperature hydrolysis it is preferred that the remaining part of the cycle should, in addition to being carried out at a hydrolysis rate not greater than 1% per minute, be carried out in such a manner as to result in a substantially constant rate of hydrolysis.

Such a constant rate of hydrolysis is most conveniently achieved by variation of the temperature of the mixture throughout this part of the cycle.

The sequence of temperature adjustments can be readily found by experiment or theoretically from the kinetics of the hydrolysis. In the former case, for example, the liquor to be used may be hydrolysed under conventional conditions, e.g. at constant temperature and the liquor sampled at appropriate intervals throughout the hydrolysis to determine the amount of hydrolysis which has taken place. The results may then be plotted against time and variations which take place in the rate of precipitation can be found. Appropriate temperature corrections can then be determined and applied to succeeding precipitations from similiar liquors to give the desired substantially constant rate of hydrolysis.

The following examples show the carrying out of hydrolyses according to the process of the present invention (Examples 1 and 2) and the titanium dioxide produced is compared with that produced from Examples 3, 4 and 5 which are not carried out according to the present invention.

EXAMPLE 1

An aqueous titanium sulphate solution was produced by digesting a titaniferous slag with concentrated sulphuric acid at an elevated temperature and thereafter lixiviating the resulting digestion cake in dilute sulphuric acid.

The suspended impurities were flocculated and the supernatant liquor decanted off to give a clarified liquor having the following characteristics:

Titanium concentration (expressed as $TiO_2$),
  g./litre _____ 205
Acid/titanium ratio _____ 1.79
Iron/titanium ratio _____ 0.155
Specific gravity (at 60° C.) _____ 1.517

This liquor was heated to 90° C. and 1.8% nuclei (expressed as $TiO_2$ on the titanium content of the liquor (also expressed as $TiO_2$)) were added.

The nuclei were rutile-inducing and were prepared by the thermal hydrolysis of an aqueous titanium tetrachloride solution after partial neutralisation with sodium hydroxide to give a suspension containing 35 g./$TiO_2$/litre.

The temperature of the solution was maintained at 97° C. for 45 minutes until the appearance of the "grey stage" (at which about 18% to 20% of the titanium sulphate was hydrolysed) and the temperature was then raised to 105° C. over the next 10 minutes. It was maintained at this level for 1 minute after which it was lowered over a period of 75 minutes to 91° C.

Thereatfer the temperature was raised slowly to about 102° C. over the remaining period of the hydrolysis (110 minutes).

During this final stage the rate of hydrolysis did not exceed 1% per minute.

The hydrous titanium dioxide precipitated was recovered by filtration, washed, leached, additioned with ZnO (0.25%), $K_2SO_4$ (0.2% as $K_2O$) and monammonium phosphate (to give a total $P_2O_5$ content of 0.25%) and thereafter calcined for 16 hours to give a final temperature of 890° C. The product was 98% rutile.

The calcined material was then slurried with sodium silicate and sand milled with Ottawa sand in a laboratory sand mill for 30 minutes and then flocculated, filtered, washed and dried at 105° C.

The tinting strength, dry brightness and tone of the final pigment (as judged visually by an experienced operator) is given in the table at the end of these examples.

EXAMPLE 2

The process described in Example 1 was repeated except that the temperature at the "grey stage" was raised only to 100° C. over a period of 4 minutes.

EXAMPLE 3

A titanium sulphate solution was prepared as described in Example 1 and this was heated at a temperature of 97° C. throughout the hydrolysis after which the precipitated hydrous titanium dioxide was recovered, treated and tested as described in Example 1.

EXAMPLE 4

A titanium sulphate solution was prepared as described in Example 1 and heated for 40 mins. at a temperature of 97° C. (i.e. until the appearance of the "grey stage"). The temperature of the solution was not raised but was reduced to 90.5° C. over a period of 40 minutes after which it was raised slowly to 103° C. over a period of 130 minutes (i.e. to the end of the hydrolysis).

The hydrous titanium dioxide precipitated was recovered, treated and tested as described in Example 1.

EXAMPLE 5

A titanium sulphate solution was prepared as described in Example 1 and heated for 45 minutes at 97° C. (i.e. until the appearance of the "grey stage").

The temperature was increased to the boiling point (108.5° C.) and during the next hour the calculated rate of hydrolysis was in excess of 1.3%/minute. The process of this example was, therefore, outside the process of the present invention.

The hydrous titanium dioxide produced was recovered, treated and tested as described in Example 1 and the results shown in the table.

It will be noted that, whereas the tinting strength of the treated material was relatively good, the dry brightness was poor.

TABLE

| Example | Tinting Strength | Dry Brightness | Tone |
|---|---|---|---|
| 1 | 1,700 | 5½ | Slight grey. |
| 2 | 1,615 | 5½–5¾ | Do. |
| 3 | 1,510 | 7 | Do. |
| 4 | 1,560 | 6 | Slight brown. |
| 5 | 1,615 | 6¾ | Slight grey. |

The tinting strength was estimated by the Reynold's Blue method.

The Dry Brightness and Tone were estimated by an experienced operator against a high quality pigment produced by the vapour phase oxidation of titanium tetrachloride.

Higher values indicate an inferior brightness.

What is claimed is:

1. A process for the thermal hydrolysis of aqueous titanium sulphate solution comprising nucleating the solution; heating it to a substantially constant temperature in the range 90° C. to 108° C. for a period of time sufficient to hydrolyse between 15% and 60% of the titanium sulphate thereafter raising the temperature of the solution by an amount in the range 2° C. to 18° C. and maintaining the temperature of the solution at a value such that the rate of hydrolysis is not greater than 1% (of the initial titanium sulphate content) per minute.

2. A process as claimed in claim 1 wherein the aqueous titanium sulphate solution is prepared by digesting a material selected from the group ilmenite and a titaniferous slag with sulphuric acid at an elevated temperature followed by lixiviating the resulting cake with water or dilute sulphuric acid.

3. A process as claimed in claim 1 wherein the aqueous titanium sulphate solution, before hydrolysis, has a titanium concentration (expressed as $TiO_2$) in the range 100 g./litre to 300 g./litre.

4. A process as claimed in claim 1 wherein the aqueous titanium sulphate solution, before hydrolysis, has an iron/titanium ratio (expressed as $Fe/TiO_2$) not greater than 1.

5. A process as claimed in claim 1 wherein the aqueous titanium sulphate solution, before hydrolysis, has an acid/titanium ratio in the range 1.6 to 2.1.

6. A process as claimed in claim 1 wherein the aqueous titanium sulphate solution is seeded with externally prepared rutile-inducing nuclei.

7. A process as claimed in claim 6 wherein the aqueous titanium sulphate solution is seeded with a quantity of nuclei (expressed as $TiO_2$) in the range 0.05% to 5% on the titanium content (expressed as $TiO_2$) of the solution.

8. A process as claimed in claim 1 wherein the aqueous titanium sulphate solution is initially heated to a substantially constant temperature in the range 95° C. to 99° C.

9. A process as claimed in claim 1 wherein the aqueous titanium sulphate solution is initially heated to a substantially constant temperature until between 15% and 25% of the titanium sulphate has been hydrolysed to $TiO_2$.

10. A process as claimed in claim 1 wherein the temperature of the aqueous titanium sulphate solution, after initial heating to a substantially constant temperature in the range 90° C. to 108° C., is raised by an amount in the range 3° C. to 10° C.

11. A process as claimed in claim 1 wherein the raising of the temperature, after the initial heating at a substantially constant temperature, is carried out over a period of not more than 25 minutes.

12. A process as claimed in claim 1 wherein the temperature to which the aqueous titanium sulphate is raised, after the initial heating at substantially constant temperature, is maintained for not more than 30 minutes.

13. A process as claimed in claim 1 wherein the temperature of the aqueous titanium sulphate solution, after the initial heating at substantially constant temperature followed by raising the temperature by an amount in the range 2° to 18° C., is lowered to one in the range 85° C. to 95° C. over a period of time in the range 30 to 180 minutes.

14. A process as claimed in claim 1 wherein the rate of hydrolysis, after the initial period of heating to a substantially constant temperature followed by raising the temperature by an amount in the range 2° to 18° C., is maintained in the range 0.2% to 1% per minute.

15. A process as claimed in claim 14 wherein the rate of hydrolysis is maintained in the range 0.2% to 0.8% per minute.

16. A process as claimed in claim 14 wherein the rate of hydrolysis, after the initial period of heating, is maintained substantially constant.

17. A process as claimed in claim 16 wherein the constant rate of hydrolysis is maintained by variation in the temperature of the mixture during this part of the process.

References Cited

UNITED STATES PATENTS

| | | | |
|---|---|---|---|
| 1,795,467 | 3/1931 | Blumenfeld | 23—202 |
| 2,361,987 | 11/1944 | Booge et al. | 23—202 |
| 2,368,591 | 1/1945 | Dahlstrom | 23—117 |
| 2,452,390 | 10/1948 | Olson | 23—202 |
| 2,503,692 | 4/1950 | Tanner | 23—202 |
| 2,531,926 | 11/1950 | Todd et al. | 23—202 |
| 2,850,357 | 9/1958 | Myers et al. | 23—117 |
| 3,091,515 | 5/1963 | Dantro et al. | 23—202 |
| 3,211,528 | 10/1965 | Wigginton | 23—202 |
| 3,341,291 | 9/1967 | Mabbs et al. | 23—202 |

FOREIGN PATENTS 447,744  5/1936  Great Britain.

OTHER REFERENCES

"Titanium" book by Jelks Barksdale, 1949 edition, pages 176, 177, 183–185, and 187–191. The Ronald Press Co., New York.

EDWARD D. STERN, Primary Examiner

U.S. Cl. X.R.

23—117; 106—300